(12) United States Patent
Ozeki

(10) Patent No.: US 10,702,951 B2
(45) Date of Patent: Jul. 7, 2020

(54) LASER MACHINE, LASER MACHINING METHOD, PLANAR-MEMBER MACHINING SYSTEM, AND PLANAR-MEMBER MACHINING METHOD

(71) Applicant: MURATA MACHINERY, LTD., Kyoto-shi, Kyoto (JP)

(72) Inventor: Koji Ozeki, Inuyama (JP)

(73) Assignee: Murata Machinery, Ltd., Kyoto (JP)

( * ) Notice: Subject to any disclaimer, the term of this patent is extended or adjusted under 35 U.S.C. 154(b) by 373 days.

(21) Appl. No.: 15/741,328

(22) PCT Filed: Apr. 13, 2016

(86) PCT No.: PCT/JP2016/061877
§ 371 (c)(1),
(2) Date: Jan. 2, 2018

(87) PCT Pub. No.: WO2017/006606
PCT Pub. Date: Jan. 12, 2017

(65) Prior Publication Data
US 2018/0193958 A1    Jul. 12, 2018

(51) Int. Cl.
*B23K 26/38*    (2014.01)
*B21D 43/10*    (2006.01)
*B23P 23/00*    (2006.01)
*B23K 26/10*    (2006.01)
*B30B 13/00*    (2006.01)
*B23K 37/04*    (2006.01)

(52) U.S. Cl.
CPC .............. *B23K 26/38* (2013.01); *B21D 43/10* (2013.01); *B23K 26/10* (2013.01); *B23K 37/0408* (2013.01); *B23P 23/00* (2013.01); *B30B 13/00* (2013.01)

(58) Field of Classification Search
CPC ......... B23K 26/38; B23K 26/10; B21D 43/10
USPC .................................................. 219/121.67
See application file for complete search history.

(56) References Cited

U.S. PATENT DOCUMENTS

| | | | |
|---|---|---|---|
| 4,687,901 A | 8/1987 | Binder et al. | |
| 6,588,738 B1 * | 7/2003 | Sukuvaara | B23K 26/06 269/293 |
| 6,750,425 B2 * | 6/2004 | Mukae | B23K 26/0884 219/121.78 |

(Continued)

FOREIGN PATENT DOCUMENTS

| | | |
|---|---|---|
| GB | 2 172 535 A | 9/1986 |
| JP | 60-82287 A | 5/1985 |

(Continued)

OTHER PUBLICATIONS

Official Communication issued in International Patent Application No. PCT/JP2016/061877, dated Jul. 19, 2016.

(Continued)

*Primary Examiner* — Huyen D Le
(74) *Attorney, Agent, or Firm* — Keating & Bennett, LLP

(57) ABSTRACT

A laser machine includes a laser head that machines a planar workpiece in a machining region while moving relative to the workpiece, a workpiece rack that is able to travel with the workpiece placed thereon, and an elevator that is able to locate the workpiece in the machining region by raising and lowering the workpiece rack with the workpiece placed thereon.

7 Claims, 12 Drawing Sheets

(56) References Cited

U.S. PATENT DOCUMENTS

| | | | |
|---|---|---|---|
| 2003/0102294 A1* | 6/2003 | Kinbara | B23K 26/04 219/121.83 |
| 2007/0228025 A1* | 10/2007 | Hom | B23K 26/04 219/121.78 |
| 2015/0290749 A1* | 10/2015 | Katsuyama | B23K 37/0408 219/121.39 |
| 2016/0228988 A1 | 8/2016 | Dallarosa et al. | |
| 2019/0039197 A1 | 2/2019 | Schmauder et al. | |

FOREIGN PATENT DOCUMENTS

| | | |
|---|---|---|
| JP | 03-57493 U | 6/1991 |
| JP | 03-68984 U | 7/1991 |
| JP | 05-023877 A | 2/1993 |
| JP | 05-031640 A | 2/1993 |
| JP | 05-042228 U | 6/1993 |
| JP | 11-277273 A | 10/1999 |
| JP | 2011-098415 A | 5/2011 |

OTHER PUBLICATIONS

English translation of Official Communication issued in International Patent Application No. PCT/JP2016/061877, dated Jan. 9, 2018.

Official Communication issued in European Patent Application No. 16821077.1, dated Jul. 25, 2019.

* cited by examiner

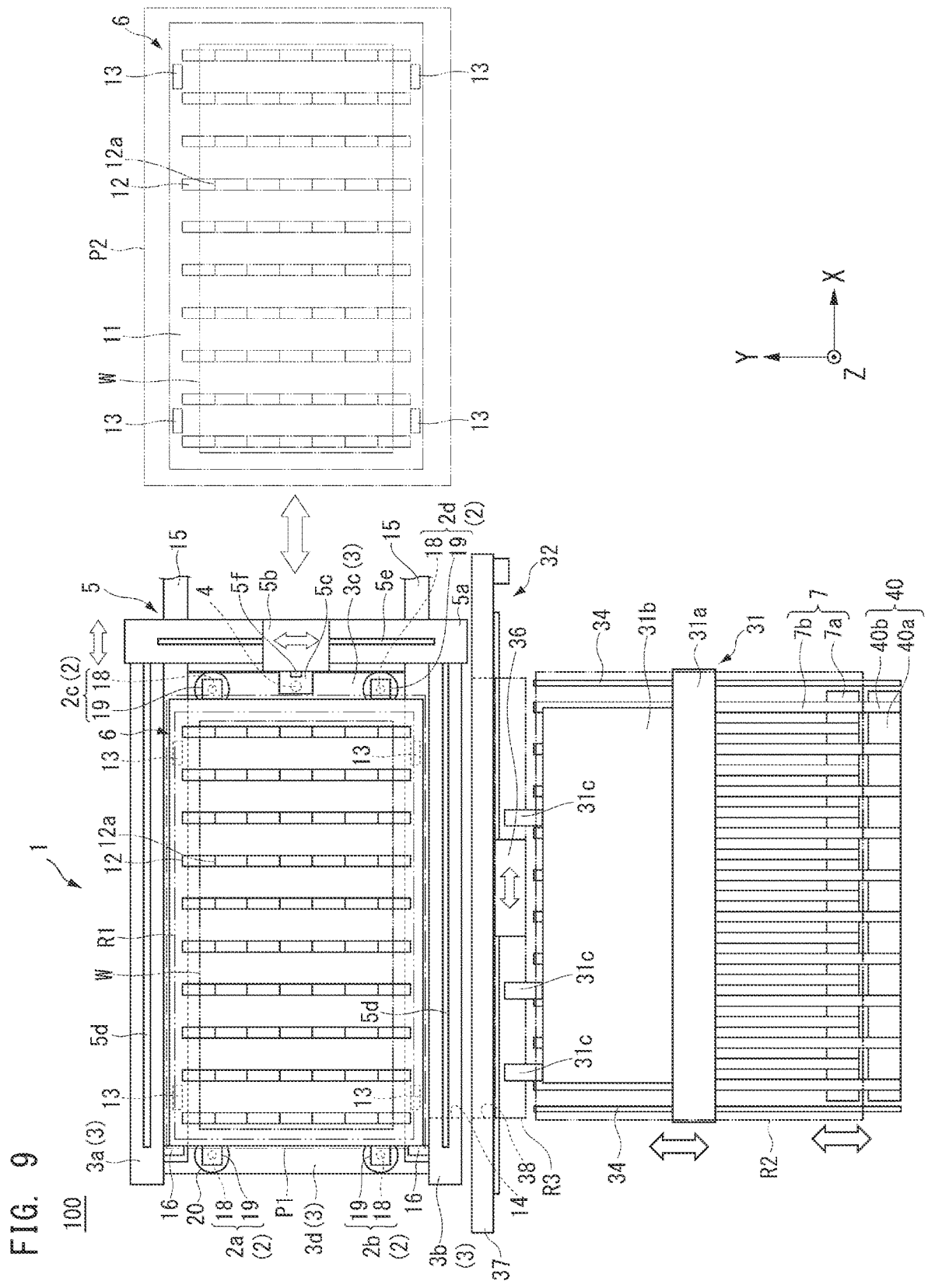

LASER MACHINE, LASER MACHINING METHOD, PLANAR-MEMBER MACHINING SYSTEM, AND PLANAR-MEMBER MACHINING METHOD

BACKGROUND OF THE INVENTION

1. Field of the Invention

The present invention relates to a laser machine, a laser machining method, a planar-member machining system, and a planar-member machining method.

2. Description of the Related Art

Examples of known apparatuses that cut a workpiece include laser machines (for example, see Japanese Unexamined Patent Application Publication No. 5-23877). A laser machine cuts a workpiece placed on a workpiece rack by moving a laser head relative to the workpiece while applying a laser to the workpiece.

The workpiece machined by the laser machine is transferred from the workpiece rack to another workpiece support or the like and carried to a predetermined place. This transfer of the workpiece from the workpiece rack to the other workpiece support is required to be performed stably and efficiently. For example, transfer of the workpiece placed on the workpiece rack by lifting it using the other workpiece support requires a space through which the workpiece is lifted. Also, preventing the workpiece from interfering with the laser head requires previously retracting the laser head, making it difficult to transfer the workpiece efficiently. Also, the upper end of the workpiece rack may be melted due to the application of laser light associated with the machining of the workpiece and thus the height at which the workpiece is placed may be reduced. For this reason, when the other workpiece support receives the workpiece, it is necessary to check the height of the workpiece as appropriate and to match the height of the workpiece support to the height of the workpiece.

SUMMARY OF THE INVENTION

In view of the foregoing, preferred embodiments of the present invention provide laser machines, laser machining methods, planar-member machining systems, and planar-member machining methods that are able to transfer a workpiece easily and efficiently by allowing a workpiece rack with the workpiece placed thereon to be raised and lowered.

A laser machine according to a preferred embodiment of the present invention includes a laser head that machines a planar workpiece located in a machining region while moving relative to the workpiece, a workpiece rack that is able to travel with the workpiece placed thereon, and an elevator that is able to locate the workpiece in the machining region by raising and lowering the workpiece rack with the workpiece placed thereon.

The machining region may be a position at which the workpiece rack is raised by the elevator. The workpiece rack may be able to travel relative to a body frame, and the elevator may include a rod that is disposed on one of the workpiece rack and the body frame and driven vertically and a receiver that is disposed on the other of the workpiece rack and the body frame and receives a front end of the rod. The front end of the rod may be in the shape of a cone, a truncated cone, or a sphere, and the receiver may have a conical, truncated conical, or spherical recess into which the front end of the rod is inserted. The elevator may include multiple elevators that support multiple portions of the workpiece rack and raise and lower the workpiece rack. The receiver or the rod on the workpiece rack may be horizontally adjustable so as to correspond to the rod or the receiver on the body frame.

A planar-member machining system according to a preferred embodiment of the present invention includes the above laser machine, a carrying apparatus that is able to carry the workpiece located on the laser machine, and a second machine that machines the workpiece in a second machining region set midway in a course through which the carrying apparatus carries the workpiece from the laser machine, the second machine including a machining tool.

A laser machining method according to a preferred embodiment of the present invention includes raising a workpiece rack with a workpiece placed thereon and laser-machining the workpiece, inserting or locating a workpiece support under the workpiece, and lowering the workpiece rack so that the workpiece is supported by the workpiece support. The laser machining method may include positioning the workpiece rack horizontally relative to the body frame in raising the workpiece rack.

A planar-member machining method according to a preferred embodiment of the present invention includes machining a planar workpiece placed on a workpiece rack while moving a laser head relative to the workpiece, carrying the workpiece placed on the workpiece rack, and machining the workpiece using a machining tool in a second machining region set midway in a course through which the workpiece is carried from the workpiece rack. The planar-member machining method includes the above laser machining method.

According to preferred embodiments of the present invention, a workpiece is able to be transferred to the other workpiece support or the like easily and efficiently by raising and lowering the workpiece rack. Even if the upper end of the workpiece rack is melted and thus the height at which the workpiece is placed is reduced, the workpiece is able to be easily transferred to the other workpiece support by raising and lowering the workpiece rack. Also, the distance between the laser head and the workpiece is able to be easily adjusted by adjusting the position to which the workpiece rack is raised.

If the machining region is set in the position at which the workpiece rack is raised by the elevator, the machined workpiece is able to be transferred from the workpiece rack easily and reliably by lowering the workpiece rack after laser machining. If the workpiece rack is able to travel relative to the body frame and the elevator includes a rod that is disposed on one of the workpiece rack and the body frame and driven vertically and a receiver that is disposed on the other of the workpiece rack and the body frame and receives a front end of the rod, the workpiece rack is able to be easily raised and lowered using the simple configuration including the vertically driven rod and the receiver. If the front end of the rod is in the shape of a cone, a truncated cone, or a sphere and the receiver has a conical, truncated conical, or spherical recess into which the front end of the rod is inserted, the workpiece rack is able to be easily positioned relative to the body frame by inserting the front end of the rod into the recess. If the elevator includes multiple elevators that support multiple portions of the workpiece rack and raise and lower the workpiece rack, the workpiece rack is able to be raised and lowered in a well-balanced manner by the elevators. If the receiver or the rod on the workpiece rack is adjustable horizontally so as to correspond to the rod or the receiver on the body frame, the rod and the receiver are able to be aligned with each other. Even if multiple workpiece racks are used alternately, each workpiece rack is able to be adapted to the elevator.

According to planar-member machining systems and planar-member machining methods of various preferred embodiments of the present invention, a workpiece is able to be transferred to the other workpiece support or the like easily and efficiently by raising and lowering the workpiece rack. Even if the upper end of the workpiece rack is melted and thus the height at which the workpiece is placed is reduced, the workpiece is able to be easily transferred to the other workpiece support by raising and lowering the workpiece rack. Also, the distance between the laser head and the workpiece is able to be easily adjusted by adjusting the position to which the workpiece rack is raised. Also, the workpiece W is easily transferred to the workpiece support and thus the workpiece W is able to be easily formed by the second machine.

According to laser machining methods of various preferred embodiments of the present invention, a workpiece is able to be transferred to the workpiece support easily and efficiently by lowering the workpiece rack. Also, the position in which the workpiece is laser-machined is able to be easily adjusted by adjusting the position to which the workpiece rack is raised. Also, if the laser machining method includes positioning the workpiece rack horizontally relative to the body frame in raising the workpiece rack, the raised workpiece rack is able to be reliably positioned relative to the frame body.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 3A and 3B include perspective views showing an example of an elevator, in which FIG. 3A shows a state in which a rod is lowered, and FIG. 3B shows a state in which the rod is raised.

FIG. 9 is a plan view showing an example of a planar-member machining system of a preferred embodiment of the present invention.

DETAILED DESCRIPTION OF THE PREFERRED EMBODIMENTS

Figure 1:
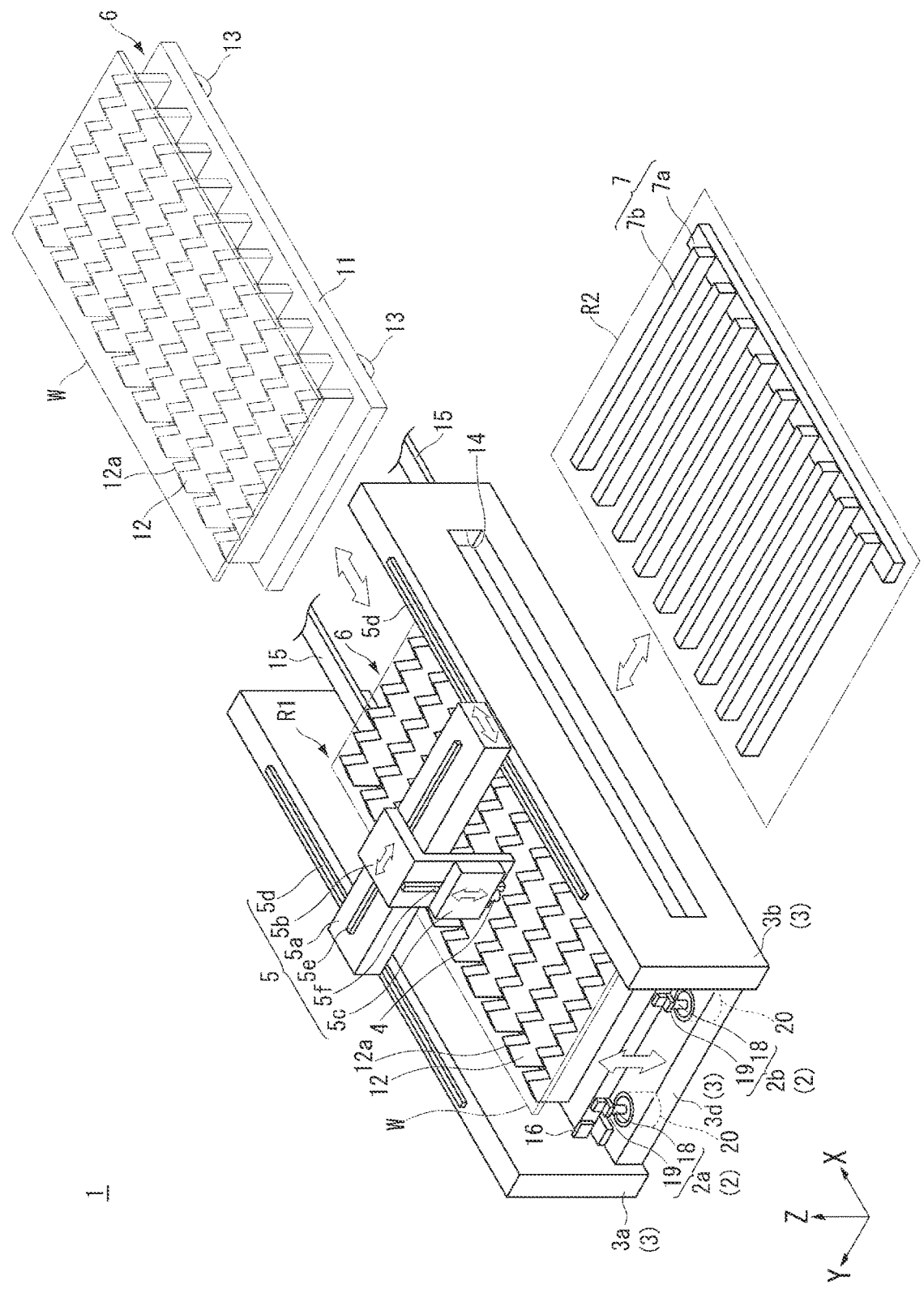
FIG. 1 is a perspective view showing an example of a laser machine of a preferred embodiment of the present invention.

Now, preferred embodiments of the present invention will be described with reference to the drawings. However, the present invention is not limited thereto. To clarify the preferred embodiment, the drawings are scaled, for example, partially enlarged or highlighted, as necessary. In the drawings, directions are shown by an XYZ coordinate system. In this XYZ coordinate system, a plane parallel with the horizontal plane is defined as an XY-plane. Any direction parallel with the XY-plane is defined as an X-direction, and a direction perpendicular to the X-direction is defined as a Y-direction. The direction perpendicular to the XY-plane is defined as the vertical direction or a Z-direction. In the present specification, the upward direction is the positive Z-direction, and the downward direction is the negative Z-direction. In the drawings, the directions of arrows represent the positive X-, Y-, and Z-directions, and the directions opposite to the directions of the arrows represent the negative X-, Y-, and Z-directions.

Figure 2:
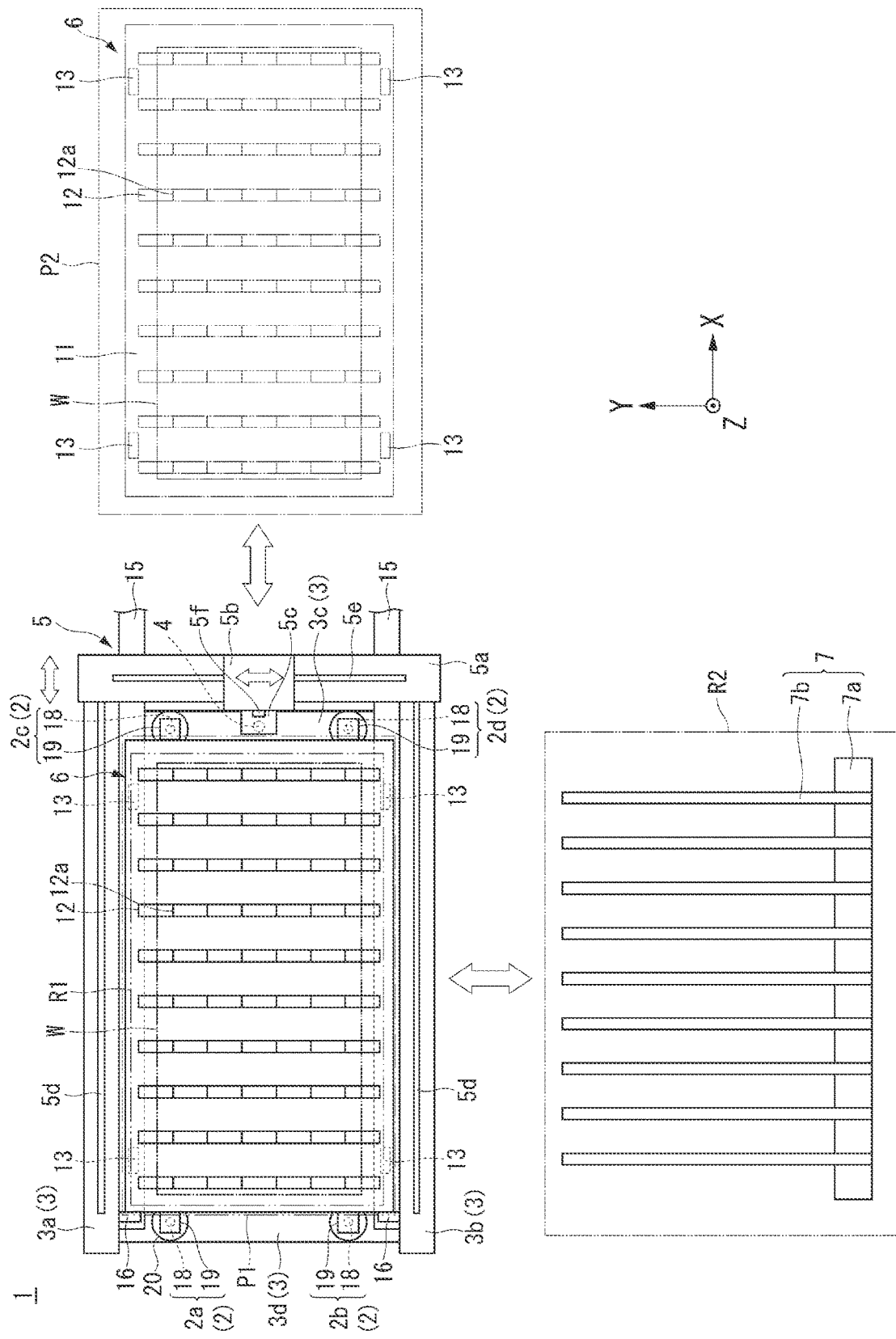
FIG. 2 is a plan view of the laser machine shown in FIG. 1.

FIG. 1 is a perspective view showing an example of a laser machine 1 of a preferred embodiment of the present invention. FIG. 2 is a plan view of the laser machine 1 shown in FIG. 1. The laser machine 1 cuts portions of a workpiece W into products having a desired shape by laser-machining the workpiece W. As shown in FIGS. 1 and 2, the laser machine 1 includes an elevator 2, a body frame 3, a laser head 4, a head driver 5, a palette (workpiece rack) 6, and a workpiece support 7. As will be described later, the laser machine 1 is able to raise and lower the palette 6 with the workpiece W placed thereon using the elevator 2.

The body frame 3 includes two frames 3a, 3b disposed along the X-direction on the positive and negative Y-sides thereof and two lower frames 3c (see FIG. 2), 3d disposed on the positive and negative X-sides thereof. The frames 3a, 3b are connected through the frames 3c, 3d. Note that the body frame 3 may have any configuration and the shapes, sizes, or number of the frame 3a and the like of the body frame 3 may be any shapes, sizes, or number.

The laser head 4 moves relative to the planar workpiece W located in a machining region R1 and machines the workpiece W. The laser head 4 has, in a lower portion thereof, an emitter (not shown) that emits laser light. The laser head 4 is connected to a laser light source (not shown) through a light transmitter, such as an optical fiber (not shown). The laser light source is, for example, a solid laser light source, such as a fiber laser. Thus, laser light having higher heat density than that of a carbon dioxide laser or the like is obtained, allowing cutting or the like to be performed quickly.

The laser head 4 is able to be moved relative to the workpiece W in the X-, Y-, and Z-directions by the head driver 5. The machining region R1 is set so as to include the range in which the laser head 4 moves in the X- and Y-directions. Since the laser machine 1 machines the workpiece W located in the machining region R1 while moving the laser head 4 relative to the workpiece W, the workpiece W is able to be machined quickly. The height of the machining region R1 is set to, for example, the height of the workpiece W placed on the palette 6 when the palette 6 is raised by the elevator 2 (to be discussed later).

The head driver 5 includes a gantry 5a, a slider 5b, and an elevator 5c. The gantry 5a is disposed along the Y-direction on a pair of guide rails 5d. The pair of guide rails 5d are disposed on the frames 3a, 3b so as to be in parallel or substantially parallel with each other along the X-direction with the machining region R1 therebetween in the Y-direction. The head driver 5 includes a driver (not shown) that moves the gantry 5a in the X-direction, such as a ball screw mechanism. The gantry 5a is able to be moved along the guide rails 5d in the X-direction by this driver.

The upper surface (the positive Z-side surface) of the gantry 5a is provided with a guide 5e. The guide 5e extends along the Y-direction and guides the slider 5b. The slider 5b extends from the upper surface to the negative X-side surface of the gantry 5a. The head driver 5 includes a driver (not shown) that moves the slider 5b in the Y-direction, such as a ball screw mechanism. The slider 5b is able to be moved along the guide 5e in the Y-direction by this driver. Note that a guide that guides the slider 5b may be provided, for example, in the negative X-side surface of the gantry 5a.

The negative X-side surface of the slider 5b is provided with a guide 5f. The guide 5f extends along the vertical direction and guides the elevator 5c. The elevator 5c is disposed on the negative X-side surface of the slider 5b. The head driver 5 includes a driver (not shown) that moves the elevator 5c vertically, such as a ball screw mechanism. The elevator 5c is able to be moved vertically along the guide 5f by this driver.

The laser head 4 is held by the elevator 5c. When the gantry 5a moves in the X-direction, the laser head 4, the slider 5b, and the elevator 5c move in the X-direction integrally; when the slider 5b moves in the Y-direction, the laser head 4 and the elevator 5c move in the Y-direction integrally; and when the elevator 5c moves vertically, the laser head 4 moves vertically. As seen above, the laser head 4 is able to be moved in the X-, Y-, and Z-directions in an upper portion of the machining region R1. Note that the head driver 5 is not limited to the above configuration. For example, the head driver 5 may move the laser head 4 in the X, Y, and Z-directions using a robot arm. Also, instead of the laser head 4, the workpiece W may be moved, or both the laser head 4 and workpiece W may be moved.

The palette 6 defining and functioning as a workpiece rack is able to travel with the workpiece W placed thereon. The palette 6 includes, for example, a base plate 11, multiple support plates 12, and multiple wheels 13. The support plates 12 are arranged in the X-direction so as to stand on the upper surface of the rectangular base plate 11, and the upper ends 12a thereof support the lower surface of the workpiece W. The distance between two support plates 12 is set such that arms 7b of the workpiece support 7 (to be discussed later) are able to be inserted therebetween.

The upper ends 12a have the workpiece W placed thereon. Since the upper ends 12a have the same height, the workpiece W is placed thereon approximately horizontally. Thus, the palette 6 also defines and functions as a table that supports the workpiece W in the machining region R1. The upper ends 12a define a sawtooth shape and therefore are in contact with the workpiece W with a small area. Thus, the welding of the workpiece W to the support plates 12 due to the machining of the workpiece W is able to be reduced, and the workpiece W is able to be easily separated from the support plates 12 by the workpiece support 7 (to be discussed later). Note that the upper ends 12a need not define a sawtooth shape and may form, for example, a pinholder shape or wave shape. Also, the palette 6 need not use the support plates 12 and may be, for example, a palette where multiple pins are disposed on the base plate 11.

The wheels 13 are disposed, for example, under the base plate 11. For example, four wheels 13 are disposed under the four corners of the rectangular base plate 11 (see FIG. 2). Note that the number of the wheels 13 is any number. For example, at least two of the wheels 13 are driven by a driver (not shown). Note that the wheels 13 need not be driven. For example, all the wheels 13 may be driven wheels and may be caused to travel by the user, or by a belt, chain, or the like.

The palette 6 is able to travel relative to the body frame 3. The wheels 13 travel relative to the body frame 3 while being guided by a pair of rails 15 extending from the body frame 3. The pair of rails 15 are disposed in a lower portion of the machining region R1 so as to be parallel or substantially parallel with each other along the X-direction, and guide the wheels 13 of the palette 6 in the X-direction. The pair of rails 15 are supported by the frames 3c, 3d. For example, a stopper 16 is disposed on the negative X-side of the frame 3a. The stopper 16 is disposed, for example, at the height of the base plate 11 of the palette 6. For example, the stopper 16 restricts the movement of the palette 6 in the negative X-direction to position the palette 6 in a position P1 (see FIG. 2). The position P1 is the position in which a rod 18 of the elevator 2 (to be discussed later) is inserted into a receiver 19 of the elevator 2 when the rod 18 is raised. The position P1 is set in a lower portion of the machining region R1. Note that whether the stopper 16 is disposed is optional.

For example, when the palette 6 is located in an external position P2, the workpiece W is placed on the upper ends 12a of the support plates 12. The palette 6 with the workpiece W placed thereon travels in the negative X-direction from the position P2, enters the body frame 3, and is positioned in the position P1 by the stopper 16. Thus, the workpiece W is carried into the body frame 3. Note that the palette 6 may be used not only to carry the workpiece W into the body frame 3 but also to place the machined workpiece W and carry it out thereof. As seen above, the palette is able to reciprocate between the laser machine 1 and the outside so that the workpiece W is able to be carried into or out of the laser machine 1.

The workpiece support 7 is able to be inserted under the workpiece W placed on the palette 6. The workpiece support 7 includes, for example, a base 7a and the arms 7b. The base 7a extends in the X-direction. Each arm 7b is in the shape of a rod extending in the positive Y-direction from the base 7a. The arms 7b are arranged in the X-direction on the upper surface of the base 7a. The arms 7b are insertable between the support plates 12 of the palette 6 when the workpiece support 7 is moved in the positive Y-direction. For example, the arms 7b are extend in the X-direction with a pitch approximately equal to that of the support plates 12. For example, brushes (not shown) are disposed at predetermined intervals on the upper surface of each arm 7b. The brushes are preferably made of, for example, a material such as resin and avoid damage to the lower surface of the workpiece W when the workpiece support 7 supports the workpiece W. Note that whether the brushes are provided is optional. Multiple free ball bearings (where balls are able to roll in all directions) may be disposed in place of the brushes.

The workpiece support 7 includes a driver (not shown) and a guide (not shown) and is able to move in the positive Y-direction from a standby region R2. Note that the frame 3b includes an opening 14 (see FIG. 1). The opening 14 has a shape through which the arms 7b of the workpiece support 7 and the workpiece W are able to be passed. The workpiece support 7 is set so as to be able to move in the Y-direction from the standby region R2 to the range in which the arms 7b are inserted under the workpiece W placed on the palette 6. The operation of transferring the workpiece W from the palette 6 to the workpiece support 7 will be described later.

The workpiece support 7 is not limited to having a fork shape having the arms 7b. For example, the workpiece support 7 may be one that is able to be positioned under the workpiece W, such as one where multiple rod-shaped members are raised from a lower portion of the machining region R1. Also, the laser machine 1 need not include the workpiece support 7.

Next, the elevator 2 will be described. The elevator 2 is able to position the workpiece W in the machining region R1 by raising and lowering the palette 6 with the workpiece W placed thereon. For example, the elevator 2 includes multiple elevators that support multiple portions of the palette 6 and raise and lower the palette 6. For example, elevators 2a, 2b, 2c, 2d are disposed near the four corners of the palette 6. By disposing the elevators 2a, 2b, 2c, 2d, the palette 6 is able to be raised and lowered stably. As shown in FIG. 2, the elevators 2a to 2d protrude from the positive and negative X-sides of the palette 6. The elevators 2a to 2d each include a rod 18 and a receiver 19.

Figure 3A:
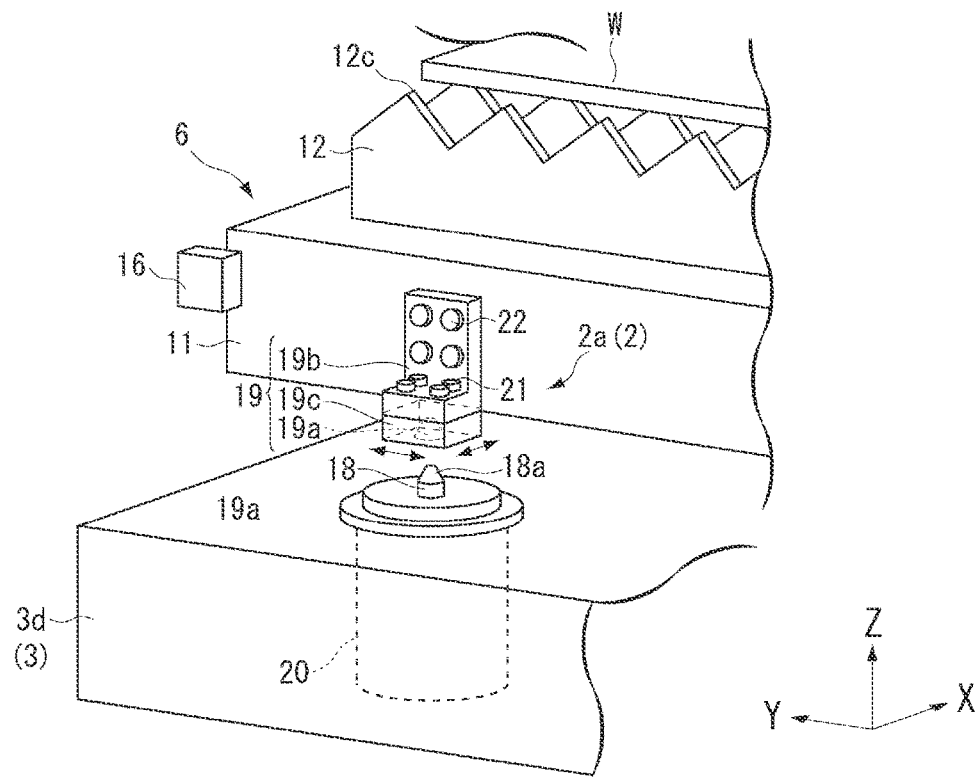
Figure 3B:
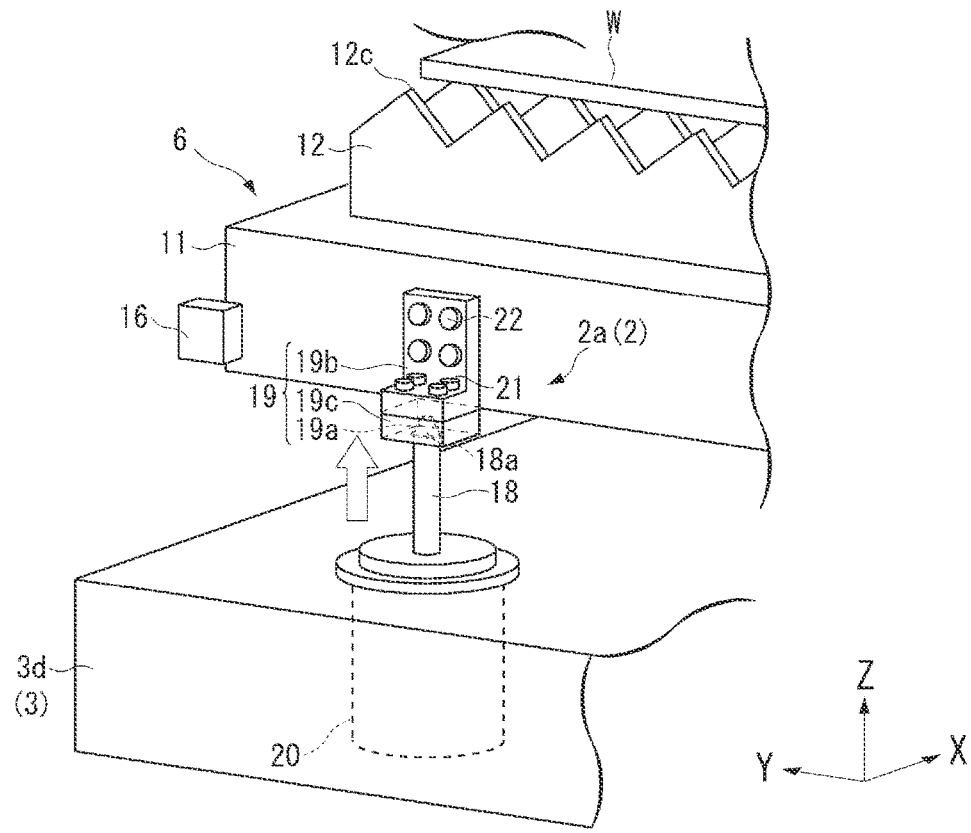

FIGS. 3A and 3B include perspective views showing an example of the elevator 2, in which FIG. 3A shows a state in which the rod 18 is lowered; and FIG. 3B shows a state in which the rod 18 is raised. While the elevator 2a is shown in FIGS. 3A and 3B, the other elevators 2b to 2d also have similar configurations. As shown in FIGS. 3A and 3B, the rod 18 of the elevator 2a is disposed on the frame 3d, and the receiver 19 thereof is disposed on the palette 6. The receiver 19 is disposed so as to correspond to the position of the rod 18. It is also disposed in the position that receives the front end of the rod 18 when the rod 18 is raised.

The rod 18 is disposed on the body frame 3 so as to be vertically movable. The rod 18 is moved vertically by activating a driver 20 disposed in the frame 3d. The driver 20 is, for example, an air cylinder or hydraulic cylinder, and the rod 18 may be a piston rod. The driver 20 may also be a ball screw mechanism using an electric motor, and the rod 18 may be a ball screw. The rod 18 and the driver 20 may be disposed away from each other. For example, the following configuration may be used: the driver 20 is disposed away from the rod 18; and the rod 18 is be moved by the driver 20 through a driving force transmitter.

The front end 18a of the rod 18 is in the shape of a truncated cone having a rounded upper end. The front end of the rod 18 has a shape corresponding to the shape of the receiver 19. Note that the front end 18a of the rod 18 need not be in the shape of a truncated cone and may be in the shape of, for example, a cone with a sharp front end or a sphere with a rounded front end.

The receiver 19 is disposed on the palette 6 and disposed in the position in which the front end 18a of the rod 18 is inserted into the receiver 19. As shown in FIGS. 3A and 3B, the receiver 19 has a truncated conical recess 19a into which the front end 18a of the rod 18 is inserted. As described above, the shape of the recess 19a preferably corresponds to the shape of the front end 18a of the rod 18 and may be a cone or sphere, for example. Also, the recess 19a may have a shape different from the front end 18a as long as the front end 18a of the rod 18 is able to be inserted thereinto.

The receiver 19 includes an L-shaped bracket 19b and a lower member 19c mounted on a lower portion of the bracket 19b. The lower member 19c includes the recess 19a in the lower surface thereof. The bracket 19b is fastened to a side surface of the base plate 11 of the palette 6 by a fastening member 21, such as a bolt. Thus, the bracket 19b is able to be mounted on the base plate 11 of the existing palette 6. The lower member 19c is fastened to the bracket 19b by a fastening member 21, such as a bolt. Note that the lower member 19c is able to be moved vertically relative to the bracket 19b by a predetermined amount by loosening the fastening member 21. Thus, it is possible to adjust the position of the recess 19a relative to the front end 18a of the rod 18. Thus, for example, if multiple palettes 6 are used, it is possible to match the position of the recess 19a of each palette 6 to the position of the front end 18a of the rod 18. That is, it is possible to realize the operation of the laser machine 1 using multiple palettes 6.

Note that the receiver 19 need not include the bracket 19b and the lower member 19c and may be a single member. Also, the receiver 19 may be disposed, for example, on the back surface of the base plate 11 of the palette 6. Also, a structure similar to the recess 19a may be provided in a portion of the back surface of the base plate 11. Instead of making the position of the recess 19a of the receiver 19 adjustable, the position of the rod 18 on the body frame 3 may be made horizontally adjustable.

As shown in FIG. 3A, the rod 18 is lowered in a state in which the driver 20 is not activated. In this state, the movement of the palette 6 is restricted by the stopper 16, and the palette 6 is placed on the frame 3d. By activating the driver 20 in this state to raise the rod 18, the front end 18a of the rod 18 is inserted into the recess 19a of the receiver 19, as shown in FIG. 3B. By further raising the rod 18, the base plate 11 (palette 6) with the workpiece W placed thereon is raised.

The position to which the palette 6 is raised is, for example, the position in which the workpiece W is located in the machining region R1 (see FIG. 2). The position to which the palette 6 is raised may be set on the basis of the length by which the rod 18 is elevated by the driver 20, or may be set by detecting the height of the palette 6 or workpiece W using, for example, an optical sensor and stopping raising the rod 18.

Figure 4A:
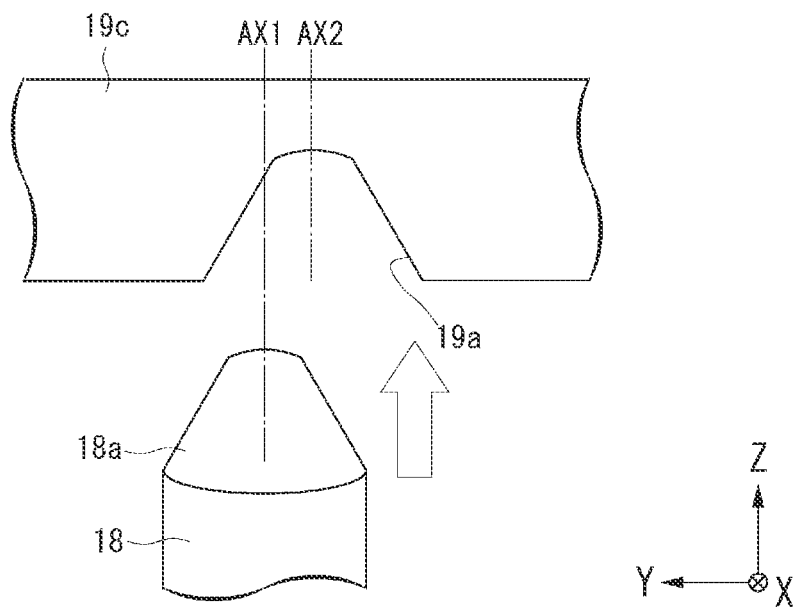
FIGS. 4A to 4C are drawings showing an example of the operation of the rod and a receiver.
Figure 4B:
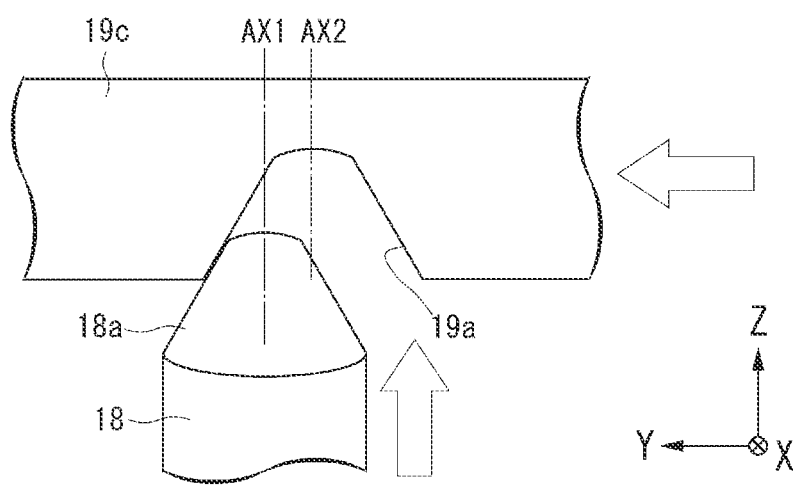
Figure 4C:
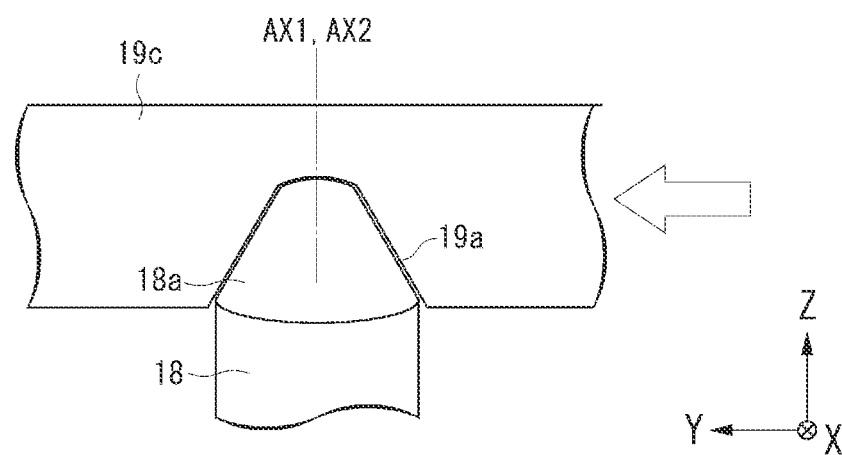

FIGS. 4A to 4C are drawings showing an example of the operation of the rod 18 and the receiver 19. FIGS. 4A to 4C include drawings showing an example of the operation of the rod 18 and the receiver 19, in which FIG. 4A is a drawing showing a state in which the rod 18 is lowered; FIG. 4B is a drawing showing a state in which the rod 18 is raised and is in contact with the recess 19a; and FIG. 4C is a drawing showing a state in which the rod 18 is inserted in the recess 19a. Although the palette 6 travels along the rails 15 and the position thereof relative to the body frame 3 is kept by the stopper 16, the position may be displaced to some extent. When the position of the palette 6 is displaced, the central axis AX1 of the front end 18a of the rod 18 and the central axis AX2 of the recess 19a become non-coaxial, as shown in FIG. 4A.

By raising the rod 18 in this state, the front end 18a of the rod 18 contacts the wall surface of the recess 19a, as shown in FIG. 4B; and by further raising the rod 18, the wall surface of the recess 19a is pressed by the front end 18a of the rod 18. Thus, the recess 19a moves in the positive Y-direction, and the central axis AX2 of the recess 19a approaches the central axis AX1 of the front end 18a. The front end 18a is in the shape of a truncated cone, and the recess 19a is also in the shape of a truncated cone. Accordingly, once a portion of the front end 18a contacts the wall surface of the recess 19a, the recess 19a is able to be easily moved as the rod 18 is raised. Due to this movement of the recess 19a in the positive Y-direction, the palette 6 is also moved in the positive Y-direction.

Then, as shown in FIG. 4C, the recess 19a is further moved in the positive Y-direction with the front end 18a of the rod 18 inserted in the recess 19a. In this state, the central axis AX2 of the recess 19a is aligned with the central axis AX1 of the front end 18a. Thus, the palette 6 is positioned in a predetermined horizontal position. The operation shown in FIGS. 4A to 4C is performed with the palette 6 placed on the body frame 3. By further raising the rod 18 with the palette 6 positioned horizontally as described above, the palette 6 is able to be raised. The workpiece W placed on the palette 6 is able to be accurately located in the machining region R1.

The elevators 2a to 2d are disposed so as to correspond to the four portions of the palette 6 (see FIG. 2), and the front end 18a of the rod 18 is inserted in the recess 19a in each of the elevators 2a to 2d. Thus, even if the palette 6 is raised by the four rods 18, the laser machine 1 is able to prevent displacement or the like of the palette 6 and to raise the palette 6 stably. Note that the elevators 2a to 2d are controlled by a controller (not shown) so that the elevators raise and lower the palette 6 synchronously. For example, the elevators 2a to 2d are controlled by the controller so that the height (position) of the rod 18, the speed at which the rod 18 is raised and lowered, or the like is synchronized between the elevators 2a to 2d and thus the workpiece W placed on the palette 6 is raised while being kept horizontal.

All the four elevators, 2a to 2d, need not include the rod 18 and the receiver 19 that operate as shown in FIGS. 4A to 4C, and at least one elevator, such as the elevator 2a, may include those elements. If two elevators (e.g., the elevators 2a, 2b) include those elements, it is possible to position the palette 6 relative to the body frame 3 in the X- and Y-directions, as well as in the rotational direction around the Z-direction. In this case, the other elevators (e.g., the elevators 2c, 2d) may be ones where the rod 18 simply pushes up the receiver 19. This eliminates the need to form the front end 18a of the rod 18 and the recess 19a of the receiver into truncated conical shapes or the like.

Figure 5:
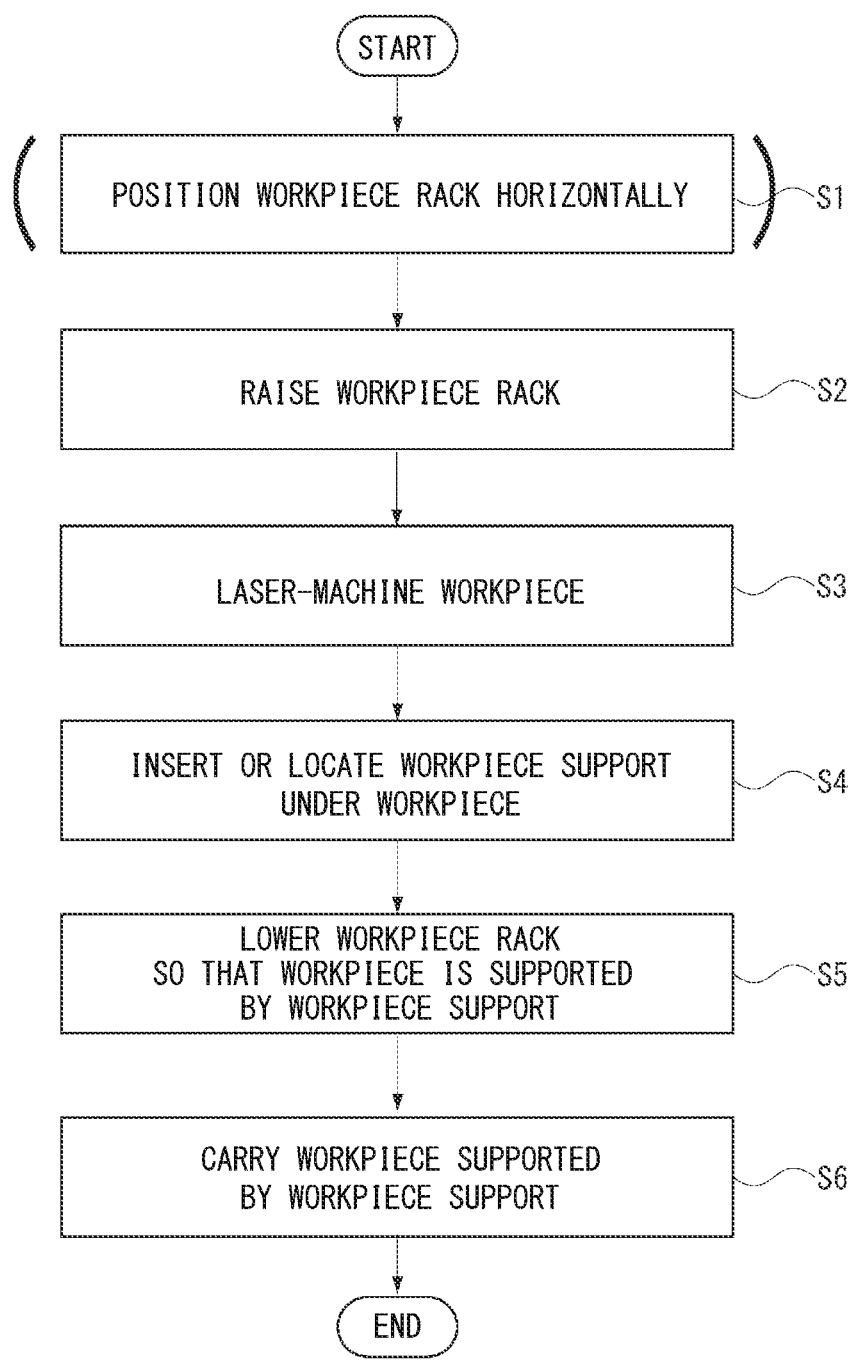
FIG. 5 is a flowchart showing an example of a laser machining method according to a preferred embodiment of the present invention.

Next, a non-limiting example of a laser machining method of the present preferred embodiment will be described on the basis of the operation of the laser machine 1 with reference to the drawings. However, the following description is only illustrative and does not limit the operation of the laser machine 1 nor the laser machining method. FIG. 5 is a flowchart showing an example of the laser machining method of the present preferred embodiment. FIGS. 6A to 8C are drawings showing the operation of the laser machine 1. The description will be made with reference to FIG. 5 and, when necessary, FIGS. 6A to 8C. While the elevators 2a, 2d are shown in FIGS. 6A to 8C, the elevators 2b, 2c also operate in a similar manner. In the following description, these elevators will be collectively referred to as the elevator 2.

Figure 6A:
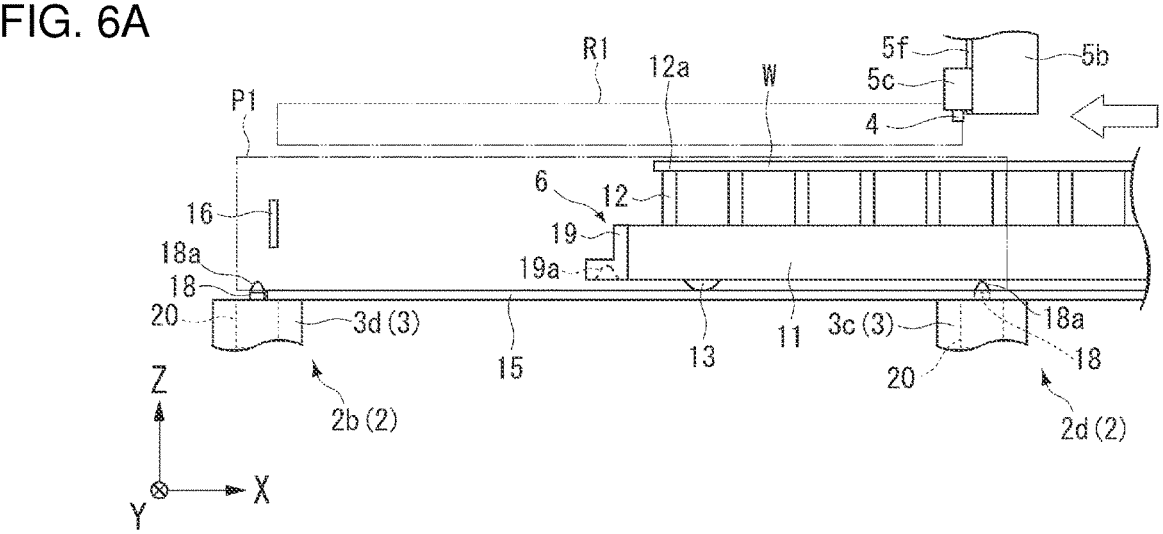
FIGS. 6A to 6C are drawings showing the operation of the laser machine.
Figure 6B:
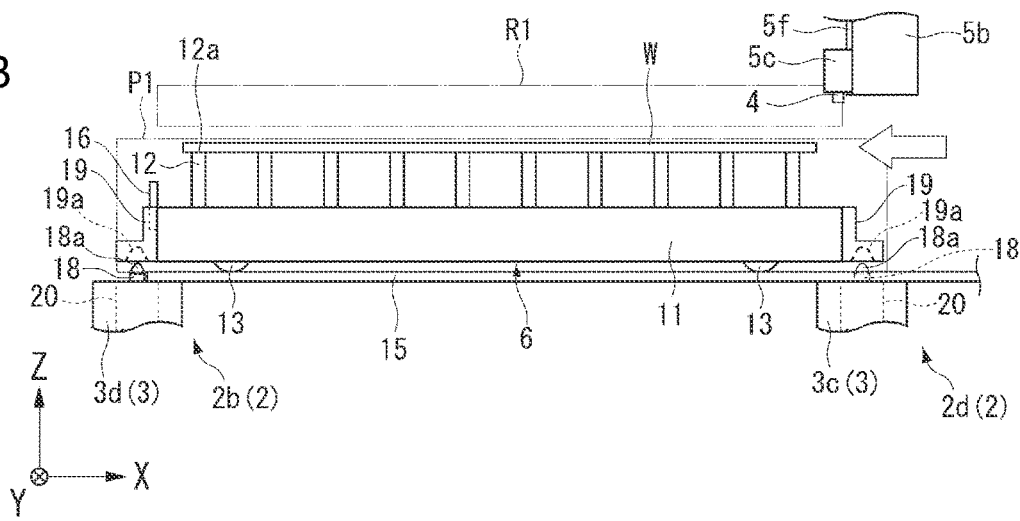
Figure 6C:
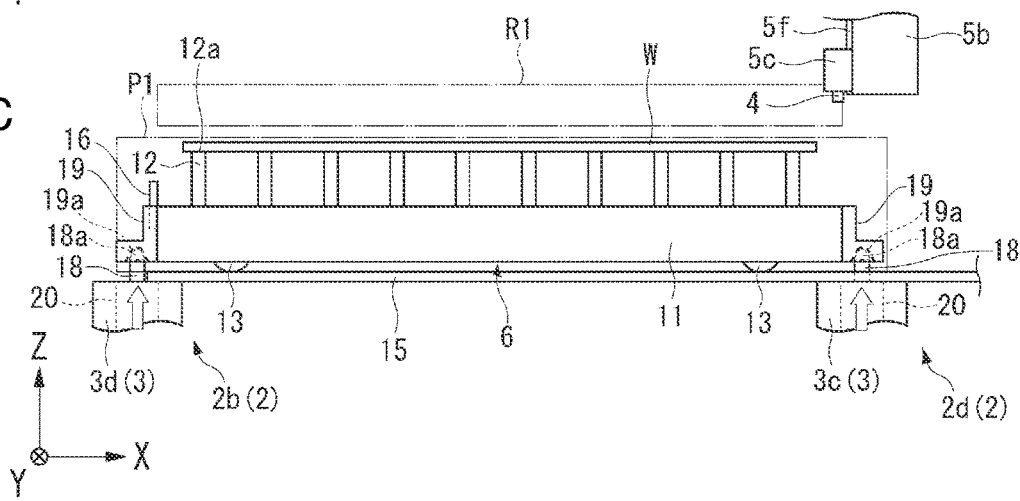

First, the laser machining method of the present preferred embodiment positions the palette 6 horizontally in step S1 shown in FIG. 5. For example, first, as shown in FIG. 6A, the palette 6 with the workpiece W placed on the upper ends 12a of the support plates 12 thereof travels from the external position P2 (see FIG. 2) into the body frame 3. At this time, the palette 6 travels in the negative X-direction relative to the body frame 3 while the wheels 13 thereof are guided by the rails 15. Then, as shown in FIG. 6B, the movement of the palette 6 in the X-direction is restricted by the stopper 16, and the palette 6 is located in the position P1 below the machining region R1. Then, as shown in FIG. 6C, the rod 18 of the elevator 2 is raised, and the front end 18a of the rod 18 is inserted into the recess 19a of the receiver 19 on the palette 6. When the rod 18 is raised, the front end 18a contacts the wall surface of the recess 19a and thus the palette 6 is positioned horizontally, as described above with reference to FIGS. 4A to 4C.

Figure 7A:
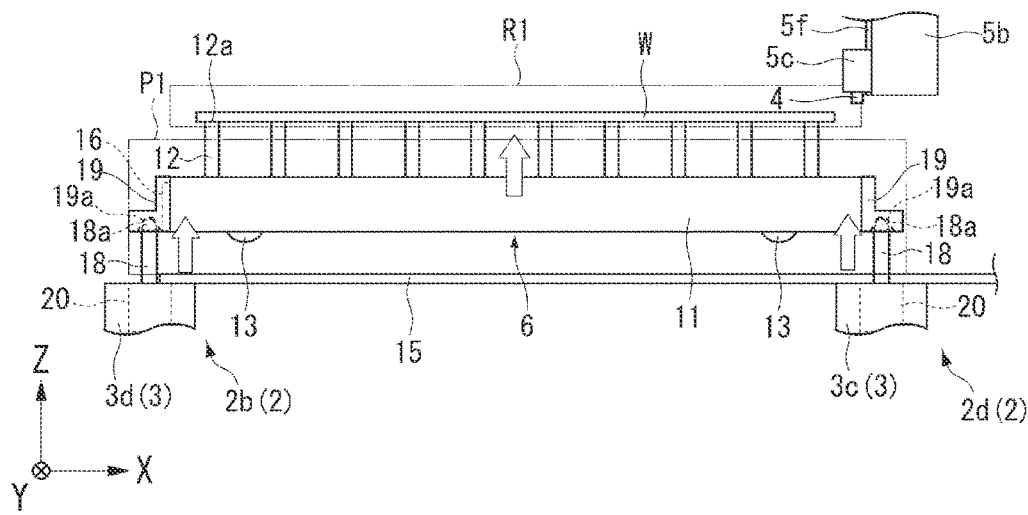
FIGS. 7A to 7C are drawings showing the operation of the laser machine following that in FIGS. 6A to 6C.

Then, in step S2 shown in FIG. 5, the palette 6 with the workpiece W placed thereon is raised. Specifically, as shown in FIG. 7A, the elevator 2 raises the horizontally positioned palette 6 by further raising the rod 18 in the state shown in FIG. 6C. At this time, the elevator 2 raises the palette 6 such that the workpiece W placed on the palette 6 is located in the machining region R1. Note that the height of the workpiece W (the height of the palette 6) may be detected using any type of sensor or the like and the elevator 2 may be controlled so that the workpiece W is located in the machining region R1.

Figure 7B:
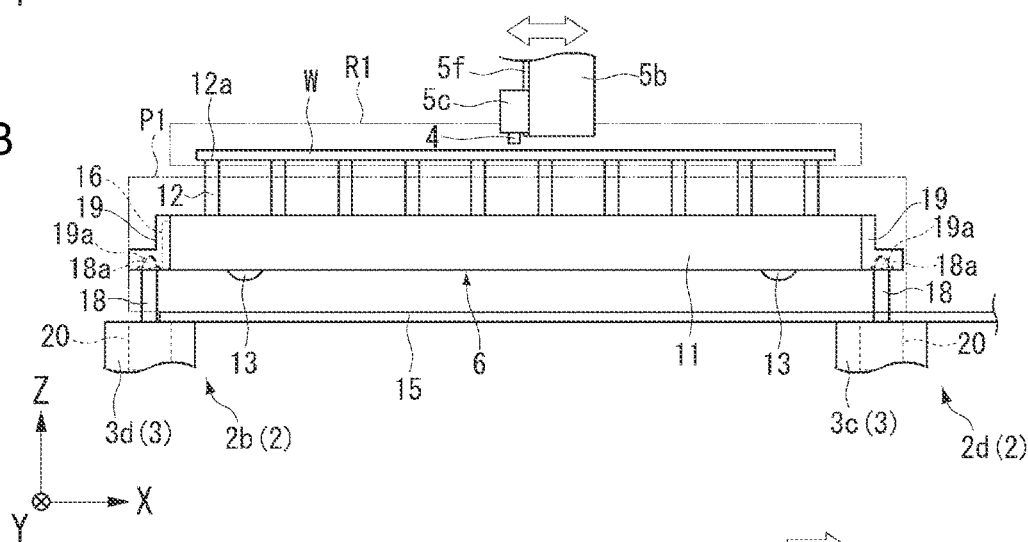

Then, in step S3 shown in FIG. 5, the workpiece W placed on the palette 6 is laser-machined. Specifically, as shown in FIG. 7B, the laser head 4 machines the workpiece W located in the machining region R1 by moving relative to the workpiece W while applying laser light to the workpiece W. At this time, the workpiece W may be laser-machined, for example, with ends thereof held by workpiece holders or the like. Also, the laser head 4 need not be moved relative to the workpiece W. For example, the workpiece W may be moved relative to the laser head 4, or both the laser head 4 and workpiece W may be moved.

Figure 7C:
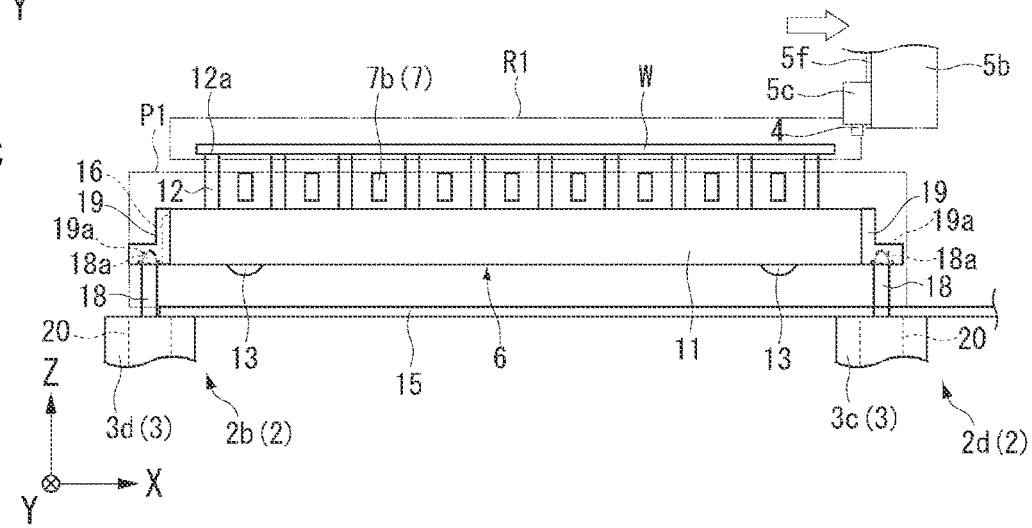

Then, in step S4 shown in FIG. 5, the workpiece support 7 is inserted or located under the workpiece W. Specifically, when the laser head 4 completes the machining of the workpiece W, the workpiece support 7 moves in the positive Y-direction from the standby region R2 (see FIG. 2) and thus the arms 7b of the workpiece support 7 are inserted between the support plates 12 of the palette 6 under the workpiece W, as shown in FIG. 7C. Note that the arms 7b are inserted between the support plates 12 through the opening (see FIG. 1) of the body frame 3.

Figure 8A:
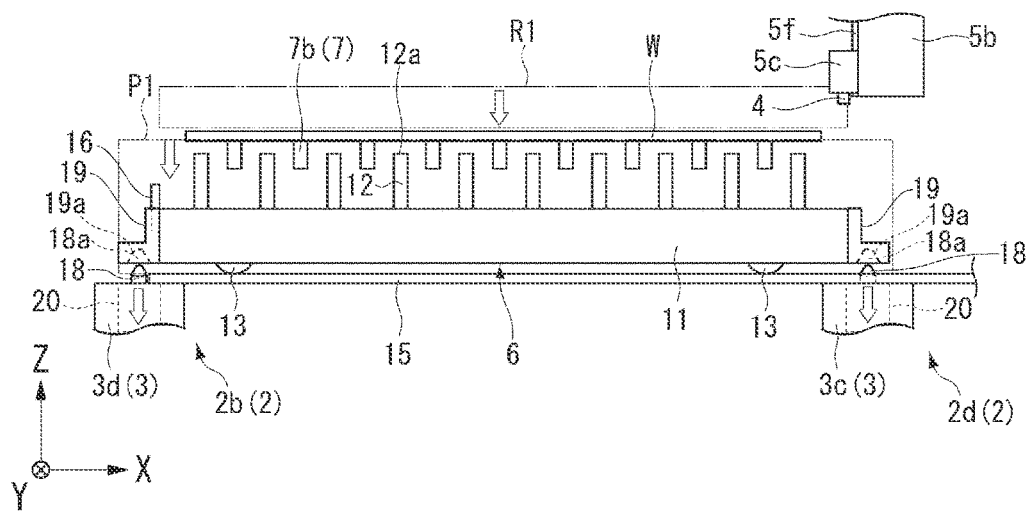
FIGS. 8A and 8B are drawings showing the operation of the laser machine following that in FIGS. 7A to 7C.

Then, in step S5 shown in FIG. 5, the palette 6 is lowered so that the workpiece W is supported by the workpiece support 7. As shown in FIG. 8A, the elevator 2 lowers the rod 18 and thus lowers the palette 6. When the palette 6 is lowered, the workpiece W placed on the upper ends 12a of the support plates 12 of the palette 6 is transferred to the arms 7b of the workpiece support 7.

Then, in step S6 shown in FIG. 5, the workpiece W transferred to the workpiece support 7 is carried to an external predetermined position, such as the standby region R2 (see FIG. 2), by a carrying apparatus (not shown). Then, the workpiece W is carried from the standby region R2 to another storage place or the like, or the assortment of products in the workpiece W, or the like is performed in the standby region R2. After the workpiece W is carried out of the body frame 3, the workpiece support 7 moves in the negative Y-direction and returns to the standby region R2 (see FIG. 2).

Figure 8B:
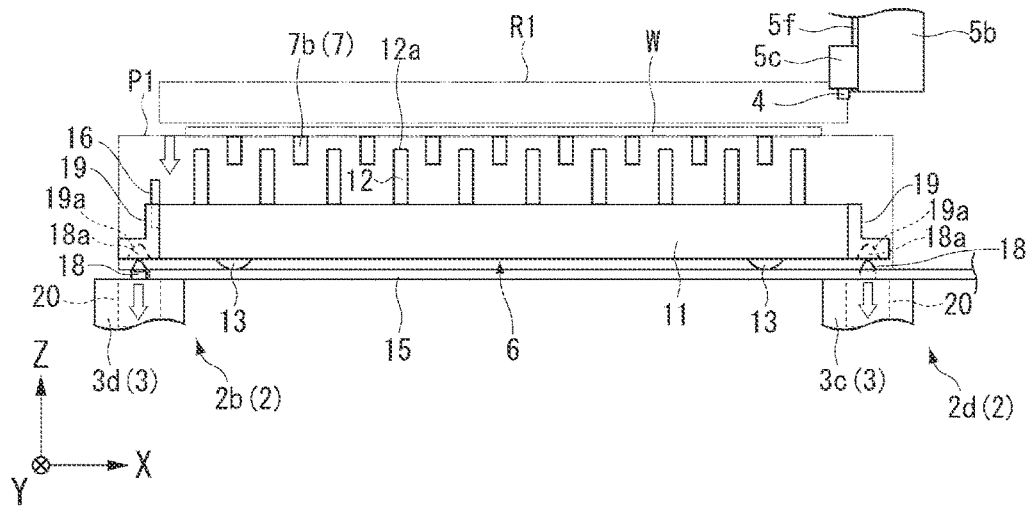

Then, as shown in FIG. 8B, the palette 6, from which the workpiece W has been transferred, travels relative to the body frame 3 in the positive X-direction. For example, the palette 6 moves to the position P2 (see FIG. 2), which is outside the body frame 3, and waits and then a new workpiece W is placed thereon. By repeating the above operation, multiple workpieces W are continuously machined.

As described above, according to the laser machine 1 and the laser machining method of the present preferred embodiment, the workpiece support 7 is inserted under the workpiece W placed on the palette 6 and then moved vertically relative to the palette 6. Thus, the workpiece W is able to be easily transferred from the palette 6 to the workpiece support 7. Also, the elevator 2 raises the palette 6 so that the workpiece W is located higher than the arms 7b of the workpiece support 7; the arms 7b are inserted; and then the elevator 2 lowers the palette 6. By only performing such simple operation, the workpiece W is able to be easily transferred from the palette 6 to the workpiece support 7.

Also, even if portions of the workpiece W are melted and welded to the support plates 12 during laser machining, the workpiece W is able to be reliably transferred to the workpiece support 7 while removing the weld, by moving the palette 6 and the workpiece support 7 vertically relative to each other. Also, even if the support plates 12 of the palette 6 are melted due to the application of laser light and thus the height at which the workpiece W is placed is changed, the workpiece W is able to be reliably located at the height of the machining region R1 by changing the amount by which the palette 6 is raised by the elevator 2.

Next, a planar-member machining system 100 according to a preferred embodiment of the present invention will be described. FIG. 9 is a plan view showing an example of the planar-member machining system 100. The planar-member machining system 100 includes the above laser machine 1, a carrying apparatus 31, and a second machine 32. The planar-member machining system 100 laser-machines a workpiece W using the laser machine 1 and forms the resulting workpiece using the second machine 32. Note that the laser machine 1 is similar to the above laser machine 1.

The carrying apparatus 31 is able to carry the workpiece W located in the machining region R1 of the laser machine 1. The carrying apparatus 31 is also able to locate the workpiece W in a second machining region R3 of the second machine 32 by carrying the workpiece W in the Y-direction. The carrying apparatus 31 includes a carriage 31a, a plate 31b, and workpiece holders 31c.

The carriage 31a is able to be moved along a pair of guides 34 in the Y-direction by a driver (not shown). The pair of guides 34 are disposed along the Y-direction with a fixed table 40 therebetween in the X-direction. The driver is, for example, a ball screw mechanism or linear motor. The plate 31b is preferably rectangular or substantially rectangular when seen from above and is fixed to the positive Y-side side surface of the carriage 31a. The X-direction length of the plate 31b preferably is set so as to correspond to the X-direction length of the workpiece W. The Y-direction length of the plate 31b preferably is set to a length such that the workpiece holders 31c are able to grasp the workpiece W supported by the palette 6 when the carriage 31a approaches the negative Y-side of an opening 38 of the second machine 32 (to be discussed later).

The workpiece holders 31c preferably are disposed in three positions on the positive Y-side of the plate 31b so as to protrude in the positive Y-direction and to be spaced from each other in the X-direction. The workpiece holders 31c are driven by a driver (not shown) and are able to grasp or release an end of the workpiece W. Note that the number of the workpiece holders 31c is any number. Instead of grasping the workpiece W, the workpiece holders 31c may adsorb portions of the workpiece W.

The second machine 32 has the second machining region R3 set midway in the course through which the carrying apparatus 31 carries the workpiece W from the palette 6. The second machine 32 includes a machining tool 36 that machines the workpiece W, and a frame 37. The machining tool 36 is, for example, a press tool or tap tool. The second machine 32 forms or taps a predetermined portion of the workpiece W using the machining tool 36. The machining tool 36 is disposed on the frame 37 so as to be movable in the X-direction relative to the frame 37. The frame 37 is provided with the opening 38. The opening 38 is formed such that the workpiece W, the workpiece support 7, and a part of the carrying apparatus 31 is able to pass therethrough. The carrying apparatus 31 carries the workpiece W between the laser machine 1 and the second machine 32 through the opening 14 of the laser machine 1 and the opening 38 of the second machine 32. The second machining region R3 is located between the machining region R1 and the standby region R2. In the second machining region R3, the workpiece W is carried in the Y-direction by the carrying apparatus 31, and the machining tool 36 moves in the X-direction. Thus, the machining tool 36 is able to be positioned over any position of the workpiece W.

The planar-member machining system 100 also includes the fixed table 40 to support the workpiece W. The fixed table 40 is disposed in the standby region R2 for the workpiece support 7 on the negative Y-side of the second machine 32. The fixed table 40 includes a base 40a extending in the X-direction and multiple rods 40b extending in the positive Y-direction from the base 40a. The upper surfaces of the rods 40b support the workpiece. Brushes or free ball bearings (where balls are able to roll in all directions) (not shown) are disposed at predetermined intervals on the upper surfaces of the rods 40b so that damage to the lower surface of the workpiece W is significantly reduced or prevented. The carrying apparatus 31 is disposed over the fixed table 40. Thus, the space over the fixed table 40 is able to be utilized, and the entire system is able to be made compact.

The planar-member machining system 100 also includes a controller (not shown). The controller includes a central processing unit (CPU) and storage devices, such as a memory and a hard disk. The storage devices store programs or the like required to perform various types of control. The controller controls, for example, the position and laser output of the laser head 4 of the laser machine 1, the drive of the workpiece support 7, the drive of the carrying apparatus 31, and the operation of the second machine 32.

Figure 10:
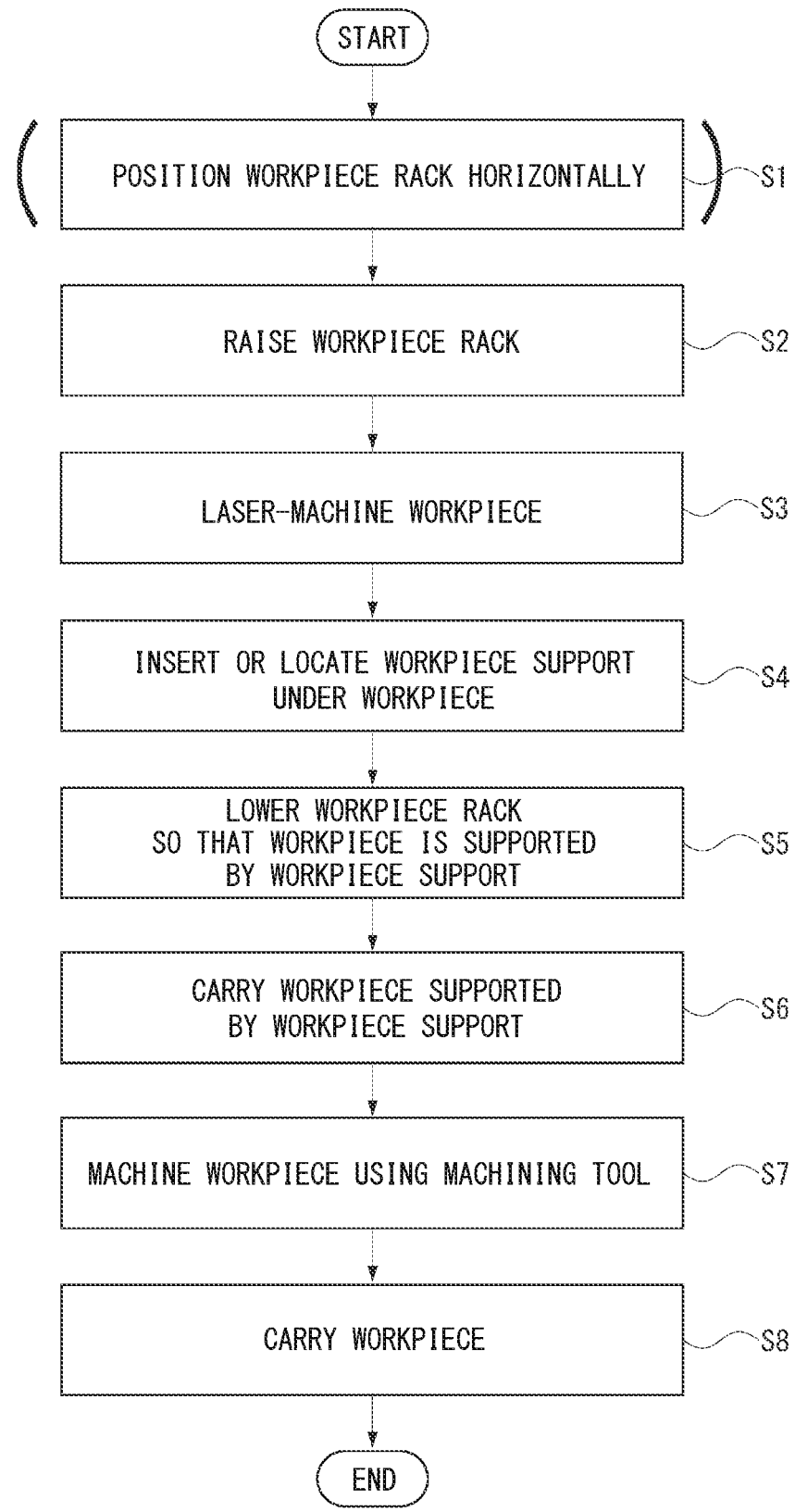
FIG. 10 is a flowchart showing an example of a planar-member machining method of a preferred embodiment of the present invention.

Next, a non-limiting example of a planar-member machining method according to a preferred embodiment of the present invention will be described with reference to the drawings. FIG. 10 is a flowchart showing an example of the planar-member machining method of the present preferred embodiment. However, the following description is only illustrative and does not limit the operation of the planar-member machining system 100 and the planar-member machining method. FIGS. 11A-11C and 12A-12C are drawings showing the operation of the planar-member machining system 100. The description will be made with reference to FIG. 10 and, when necessary, FIGS. 11A-11C and 12A-12C. Steps S1 to S5 in FIG. 10 are similar to those shown in FIG. 5 and therefore the description thereof will be simplified.

Figure 11A:
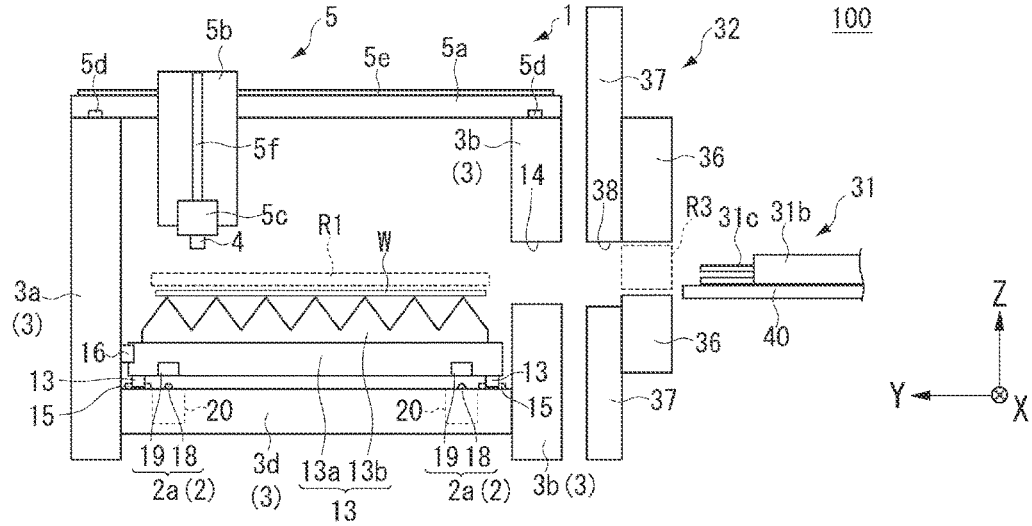
FIGS. 11A to 11C are drawings showing the operation of the planar-member machining system.
Figure 11B:
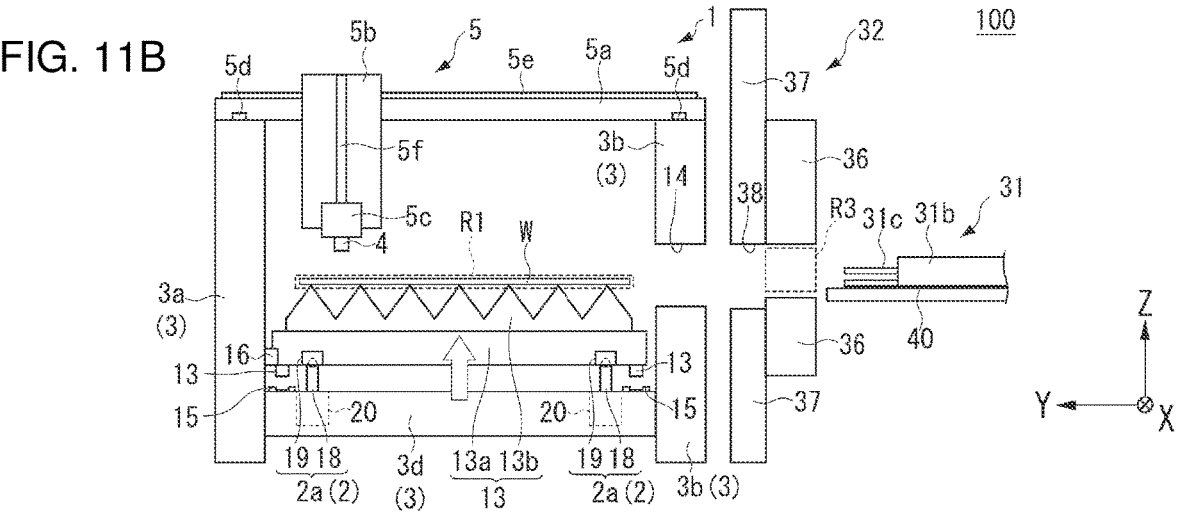
Figure 11C:
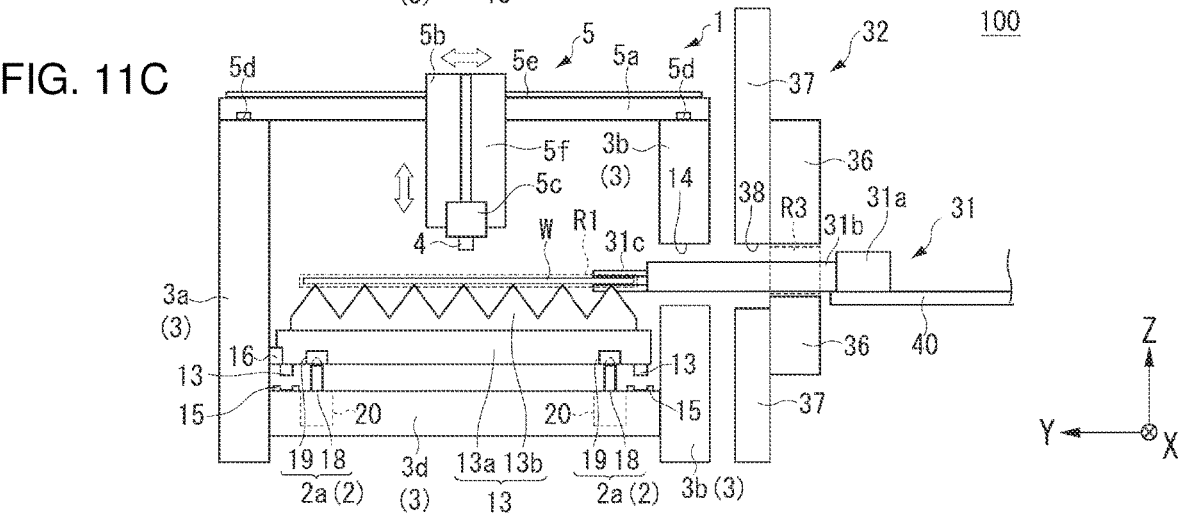

First, in step S1 shown in FIG. 10, the palette 6 with the workpiece W placed thereon is positioned horizontally. As shown in FIG. 11A, as in the FIGS. 6A and 6B, the palette 6 is carried from the outside into the laser machine 1. Then, in step S2 shown in FIG. 10, the palette 6 is raised. As shown in FIG. 11B, as in FIGS. 6C and 7A, the elevator 2 raises the palette 6 so that the workpiece W is located in the machining region R1. Then, in step S3 shown in FIG. 10, the workpiece W is laser-machined. At this time, as shown in FIG. 11C, the carrying apparatus 31 moves in the positive Y-direction and grasps the end of the workpiece W using the workpiece holders 31c. Thus, displacement of the workpiece W is able to be prevented during laser machining. Note that the workpiece W need not be grasped using the workpiece holders 31c during laser machining. As in FIG. 7B, the laser machine 1 machines the workpiece W by applying laser light to the workpiece W while moving the laser head 4 relative to the workpiece W.

Figure 12A:
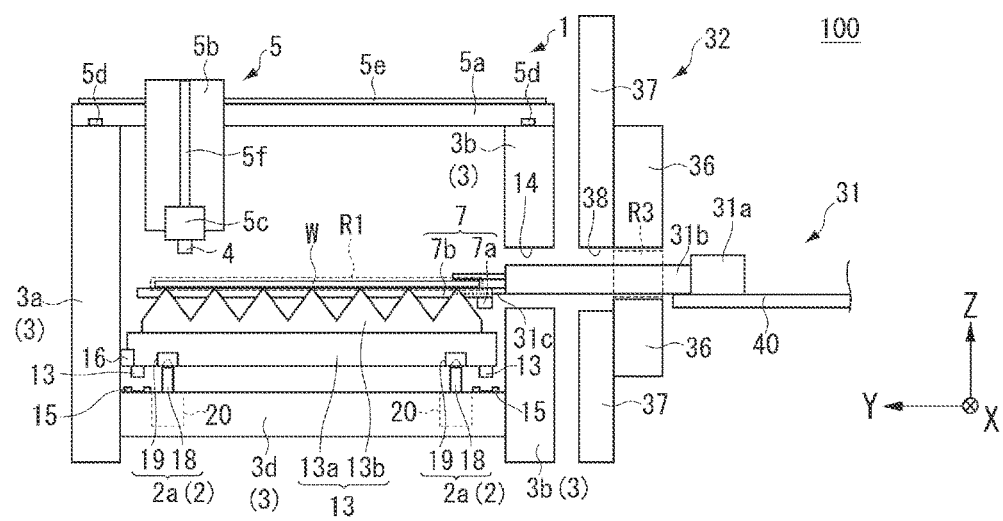
FIGS. 12A to 12C are drawings showing the operation of the planar-member machining system following that in FIGS. 11A to 11C.
Figure 12B:
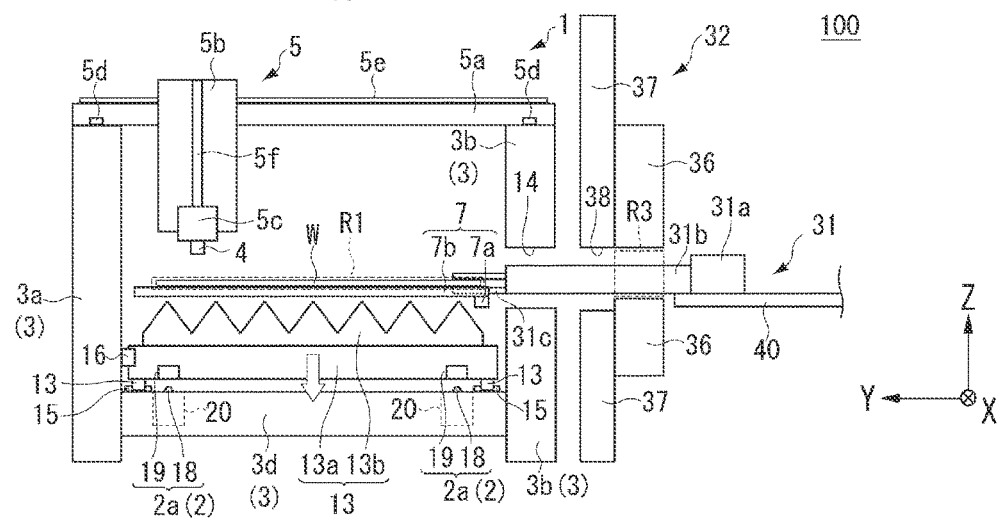

Then, in step S4 shown in FIG. 10, the workpiece support 7 is inserted under the workpiece W. Specifically, as shown in FIG. 12A, as in FIG. 7C, the workpiece support 7 moves in the positive Y-direction from the standby region R2 (see FIG. 9) and is inserted under the workpiece W. Then, in step S5 shown in FIG. 10, the palette 6 is lowered so that the workpiece W is supported by the workpiece support 7. As shown in FIG. 12B, as in FIG. 8A, the elevator 2 lowers the rod 18 and thus lowers the palette 6. Thus, the workpiece W is able to be easily transferred from the palette 6 to the workpiece support 7. As described above, even if portions of the workpiece W are melted and welded to the support plates 12 during laser machining, it is possible to transfer the workpiece W to the workpiece support 7 while removing the welds.

Figure 12C:
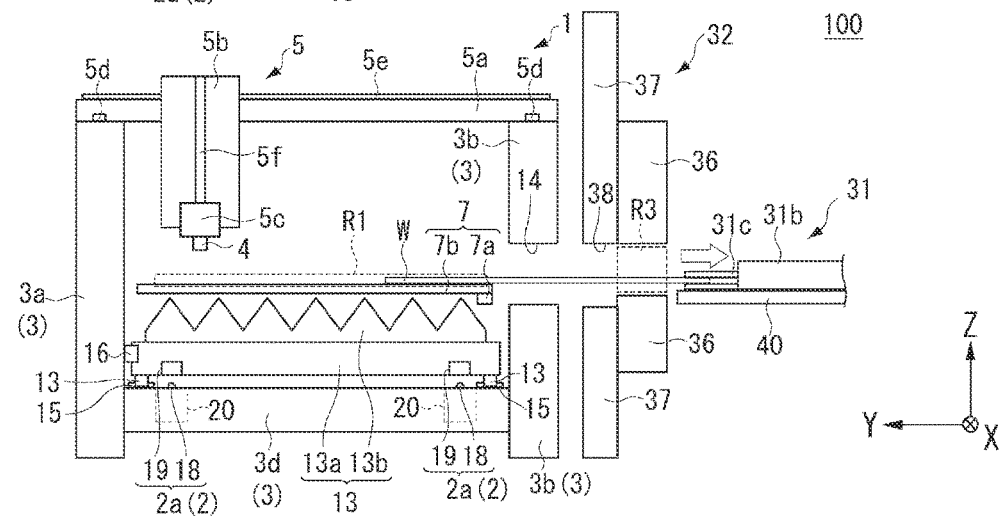

Then, in step S6 shown in FIG. 10, the carrying apparatus 31 carries the workpiece W placed on the palette 6. Specifically, as shown in FIG. 12C, the carrying apparatus 31 carries the workpiece W in the negative Y-direction. At this time, as with the fixed table 40, the workpiece support 7 defines and functions as a table to support the workpiece W. The carrying apparatus 31 positions a predetermined portion of the workpiece W in the second machining region R3 set midway in the course through which it carries the workpiece W. Then, in step S7 shown in FIG. 10, the second machine 32 forms or taps the predetermined portion of the workpiece W positioned in the second machining region R3 using the machining tool 36.

Then, in step S8 shown in FIG. 10, the workpiece W is carried to an external predetermined position (e.g., the standby region R2 shown in FIG. 9) by the carrying apparatus 31. Then, the workpiece W is carried from the standby region R2 to, for example, another storage place or the like, or assortment of products in the workpiece W, or the like is performed in the standby region R2. After the workpiece W is carried out of the body frame 3, the workpiece support 7 moves in the negative Y-direction and returns to the standby region R2 (see FIG. 9). Note that in step S8 shown in FIG. 10, the carrying apparatus 31 may carry the workpiece W to the machining region R1 and the workpiece W may be laser-machined again.

As seen above, according to the planar-member machining system 100 and the planar-member machining method of the present preferred embodiment, the workpiece W is able to be transferred to the workpiece support 7 easily and reliably by raising and lowering the palette 6. Also, there is no need to provide a complicated mechanism to raise and lower the workpiece support 7 and thus the apparatus cost is able to be reduced. Also, the workpiece W is easily transferred to the workpiece support 7 and thus is able to be efficiently carried by the carrying apparatus 31. As a result, the workpiece W is able to be efficiently carried to the second machine 32 and positioned there.

While the preferred embodiments of the present invention have been described, the technical scope of the present invention is not limited thereto. While, in the preferred embodiments, the elevators 2a to 2d preferably are disposed in the four positions, other configurations may be used. For example, elevators 2 may be disposed in one to three positions or five or more positions. If elevators 2 are disposed in one or two positions, a guide that vertically guides a portion of the palette 6 may be disposed in the body frame 3 so that the one or two elevators 2 are able to raise and lower the palette 6 in a well-balanced manner. The following configuration may also be used: one or two elevators 2 raise and lower a planar member; and the palette 6 is placed on the planar member and then raised and lowered.

While, in the preferred embodiments, the rod 18 of the elevator 2 preferably is disposed on the body frame 3 and the receiver 19 preferably is disposed on the palette 6, other configurations may be used. For example, the rod 18 may be disposed on the palette 6, and the receiver 19 may be disposed on the body frame 3. Also, with respect to some of the elevators 2a to 2d, the rod 18 may be disposed on the palette 6, and the receiver 19 may be disposed on the body frame 3.

While, in the preferred embodiments, the workpiece W supported by the workpiece support 7 preferably is carried out of the body frame 3 by the carrying apparatus 31, other configurations may be used. For example, the laser-machined workpiece W may be transferred to the workpiece support 7 and then carried out of the body frame 3. Or, the machined workpiece W placed on the palette 6 may be carried out of the body frame 3. In this case, the machined workpiece W placed on the palette 6 may be carried out of the body frame 3 after inserting the arms 7b of the workpiece support 7 under the workpiece W and moving the palette 6 and the workpiece support 7 vertically relative to each other to remove the welds between the workpiece W and the support plates 12.

While, in the preferred embodiments, the workpiece W preferably is transferred to the workpiece support 7 by lowering the palette 6, other configurations may be used. For example, the workpiece W may be transferred by raising the workpiece support 7 relative to the palette 6. Or, the workpiece W may be transferred by lowering the palette 6 and simultaneously raising the workpiece support 7.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A planar-member machining system comprising:
 a laser machine including:
  a workpiece rack on which a planar workpiece is placed;
  a laser head to machine the planar workpiece located in a first machining region of the laser machine, the laser head being movable in one direction in a horizontal plane and another direction orthogonal to the one direction relative to the planar workpiece which is stationary on the workpiece rack; and
  an elevator to locate the planar workpiece in the first machining region by raising and lowering the workpiece rack with the planar workpiece placed thereon;
 a second machine to machine the planar workpiece in a second machining region different from the first machining region, the second machine including a machining tool;
 a workpiece support to receive the planar workpiece from the workpiece rack in the first machining region, to support the planar workpiece, and to pass the planar workpiece to the workpiece rack; and a carrying apparatus to hold the planar workpiece when the planar workpiece is placed on the workpiece support and positioned between the first machining region and a region on an opposite side of the second machining region from the first machining region, and to carry the planar workpiece over the workpiece support; wherein the machining tool of the second machine is movable in an intersecting direction that intersects a direction in which the carrying apparatus carries the planar workpiece.

2. The planar-member machining system of claim 1, wherein the first machining region is set in a position to which the planar workpiece rack is raised by the elevator.

3. The planar-member machining system of claim 1, wherein the workpiece rack is able to travel relative to a body frame of the laser machine; and the elevator includes:
a rod that is disposed on one of the workpiece rack and the body frame and driven vertically; and
a receiver that is disposed on the other of the workpiece rack and the body frame and receives a front end of the rod.

4. The planar-member machining system of claim 3, wherein the front end of the rod has a shape of a cone, a truncated cone, or a sphere; and
the receiver has a conical, truncated conical, or spherical recess into which the front end of the rod is inserted.

5. The planar-member machining system of claim 3, wherein the receiver or the rod on the workpiece rack is adjustable horizontally so as to correspond to the rod or the receiver on the body frame.

6. A planar-member machining method comprising:
raising a workpiece rack on which a planar workpiece is placed;
moving a laser head in one direction in a horizontal plane and another direction orthogonal to the one direction, and laser-machining the planar workpiece which is stationary on the workpiece rack in a first machining region;
inserting or locating a workpiece support under the planar workpiece;
lowering the workpiece rack so that the planar workpiece, that has been placed on the workpiece rack in the first machining region, is received by the workpiece support and is placed on and supported by the workpiece support;
passing the planar workpiece placed on and supported by the workpiece support to the workpiece rack for placement;
machining the planar workpiece by a machining tool in a second machining region different from the first machining region;
holding the planar workpiece when the planar workpiece is placed on the workpiece support and positioned between the first machining region and a region on an opposite side of the second machining region from the first machining region; and
carrying the planar workpiece by moving the planar workpiece over the workpiece support; wherein
the machining tool is movable in an intersecting direction that intersects a direction in which the planar workpiece is carried.

7. The planar-member machining method of claim 6, further comprising positioning the workpiece rack horizontally relative to a body frame by raising the workpiece rack.

* * * * *